June 17, 1930.   F. C. NENZEL   1,764,741
FLUID PRESSURE BRAKE
Filed Feb. 28, 1929   3 Sheets-Sheet 1

INVENTOR
Frederick C. Nenzel
by his attorneys

June 17, 1930.  F. C. NENZEL  1,764,741
FLUID PRESSURE BRAKE
Filed Feb. 28, 1929   3 Sheets-Sheet 2
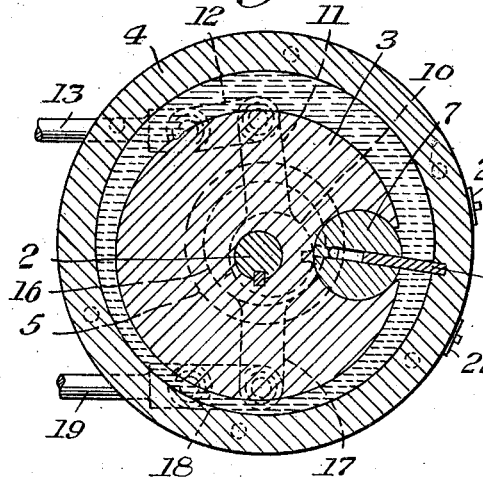
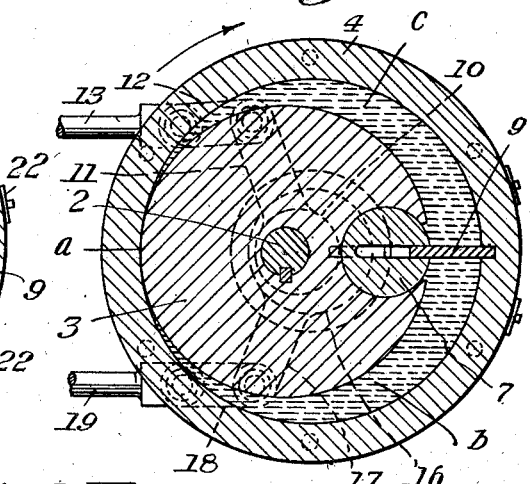
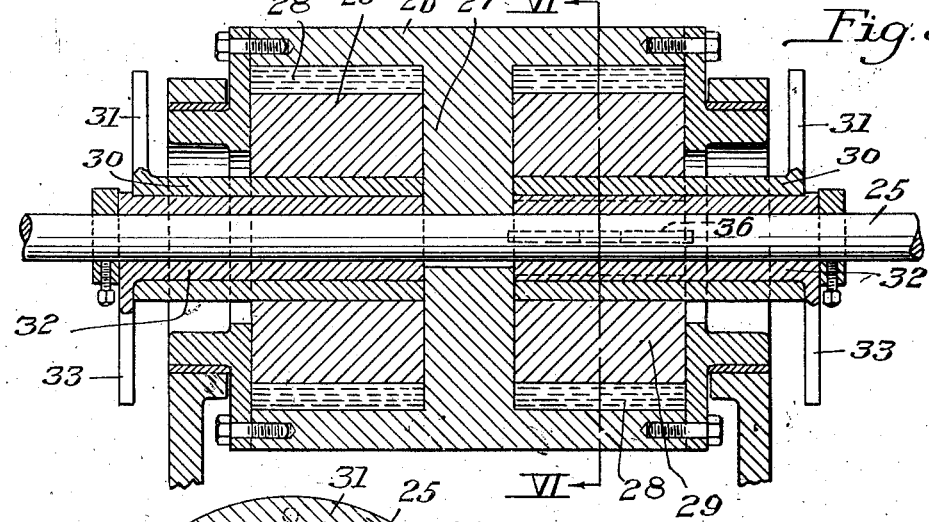
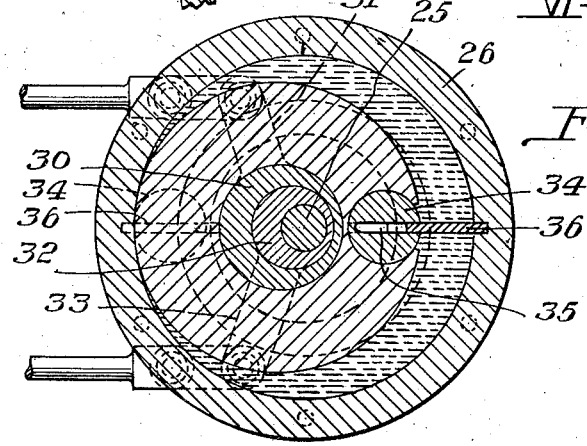
INVENTOR

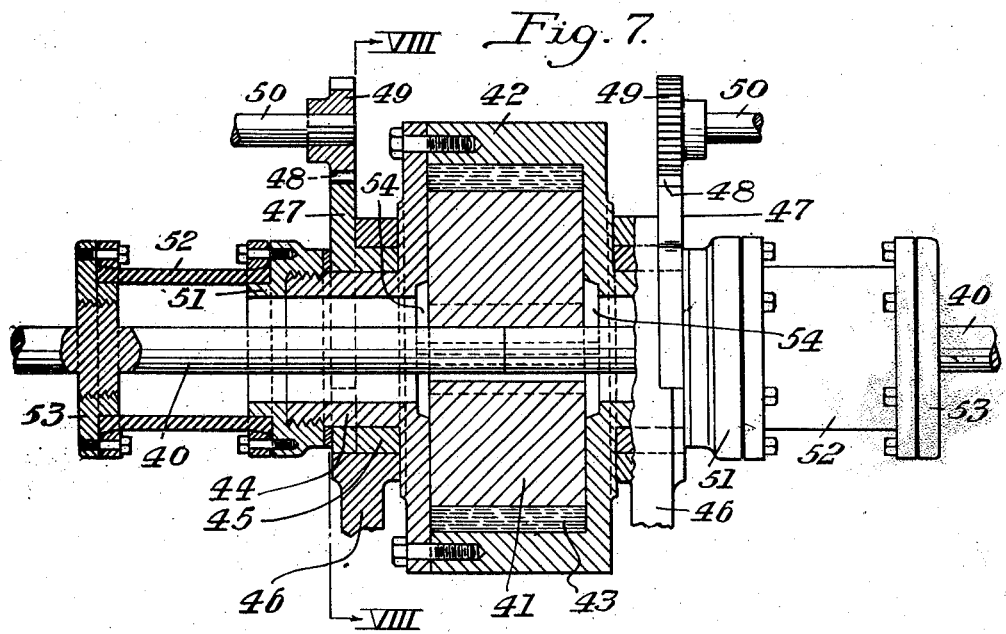
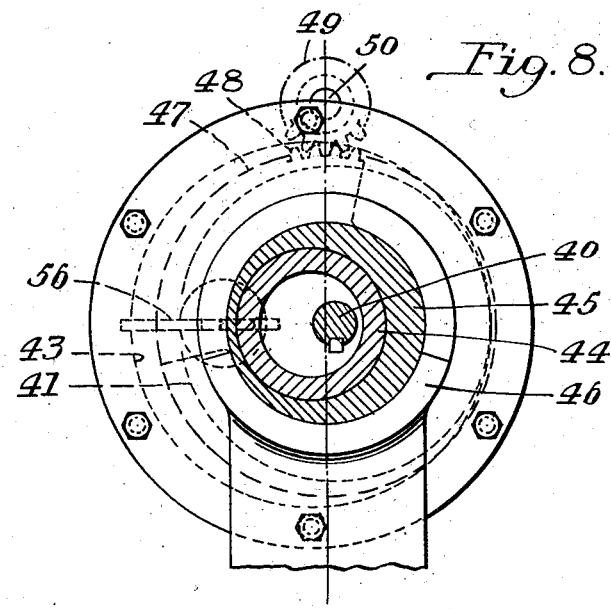

Patented June 17, 1930

1,764,741

UNITED STATES PATENT OFFICE

FREDERICK C. NENZEL, OF PITTSBURGH, PENNSYLVANIA

FLUID-PRESSURE BRAKE

Application filed February 28, 1929. Serial No. 343,343.

This invention relates to fluid pressure mechanisms, and more especially to a fluid pressure mechanism of novel construction particularly adapted for use as a brake, although it is to be understood that the invention is not specifically limited to such purpose.

According to the present invention there is provided a fluid pressure mechanism in the nature of an eccentric pump wherein there is a revolving cylinder member and a revolving piston member within the cylinder, said members being arranged to revolve at the same speed, but one of them revolving about an axis which is eccentric to the revolution of the other.

The invention further contemplates the provision in a mechanism of this kind of means for varying the eccentricity. When the mechanism is incorporated in a braking system, a braking action is obtained without resorting to the use of friction elements.

In the drawings, which may be considered as merely illustrative of my invention:

Figure 3 is a view similar to Figure 2 with the outer casing removed, showing the parts moved to a position to effect partial braking.

Figure 4 is a view similar to Figure 3 showing the parts moved to full braking position.

Figure 5 is a view similar to Figure 1 of a modified arrangement wherein the eccentricity of the piston may be varied instead of the cylinder.

Figure 6 is a transverse vertical section in the plane of line VI—VI of Figure 5, showing the parts in a full braking position.

Figure 7 is a view partially in section and partially in elevation showing another embodiment of my invention wherein special means is provided for preventing the escape of fluid from the mechanism.

Figure 8 is a transverse vertical section in substantially the plane of line VIII—VIII of Figure 7.

Figure 1:
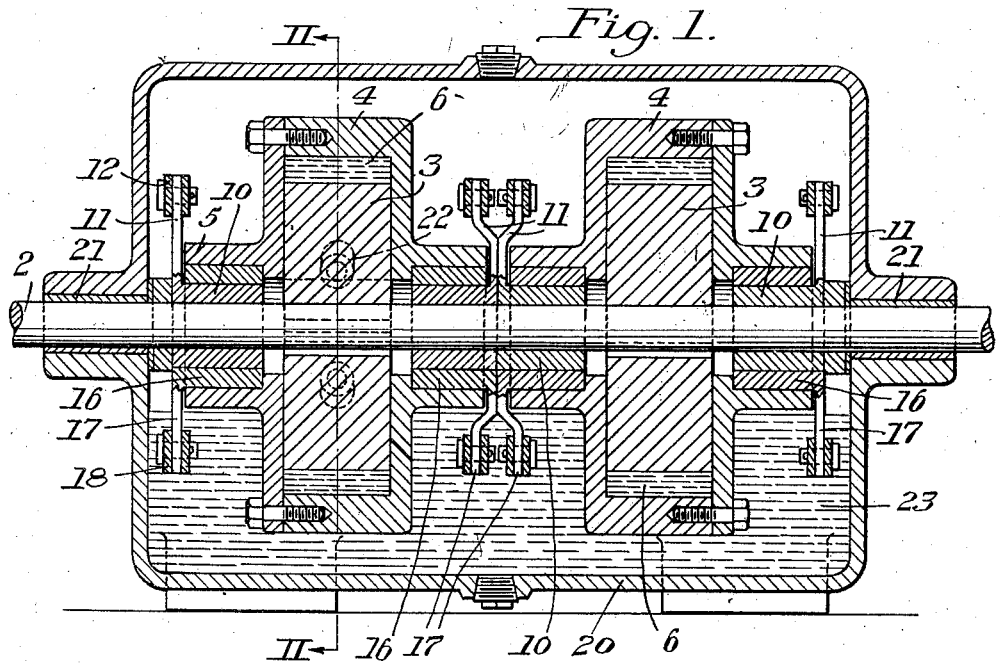
Figure 1 is a longitudinal vertical section through one form of mechanism embodying my invention, this mechanism being shown as a brake, means being provided for varying the eccentricity of the cylinder with respect to the piston.

Referring first to the construction shown in Figures 1 to 4 inclusive, 2 designates a rotating shaft, which may be the propeller shaft of an automobile, or may be any other revolving shaft to which a braking action is to be applied. Keyed onto the shaft 2 are one or more pistons 3, these pistons being in the form of solid disks. In Figure 1 I have shown a braking unit comprising two fluid pressure mechanisms arranged in opposite phase. Both of these mechanisms are alike, and only one of them need be described. Corresponding reference numerals have been used to designate corresponding parts of the two fluid pressure units. By reason of the fact that the piston 3 is keyed directly on the shafts 2, it will of course rotate at all times with the shaft 2. Enclosing the piston 3 is a cylinder element 4 having hub portions 5 at each side thereof. Within the cylinder 4 is a chamber 6 of greater diameter than the diameter of the piston 3, but the width of the cylinder is preferably such that the side faces of the piston 3 have a sliding fit with the inner faces of the chamber. Packing might be used between the side faces of the cylinder and the side faces of the piston to more effectively seal the mechanism against the escape of fluid between the side faces of the two elements.

Carried in the disk or piston 3 is a pin 7 having a transverse slot 8 therein. Fitted into this slot 8 is one end of a vane 9, the other end of the vane 9 being carried in the outer casing or cylinder wall 4.

Mounted on the shaft 2 within the hub 5 is an eccentric bushing 10 having an operating extension 11 which may be coupled to any suitable operating means, such as the link 12 and the rod 13. Surrounding the eccentric 10 and within the hub 5 is a second eccentric 16 having a similar operating extension 17 to which is connected an operating link 18 and a rod 19.

Figure 2:
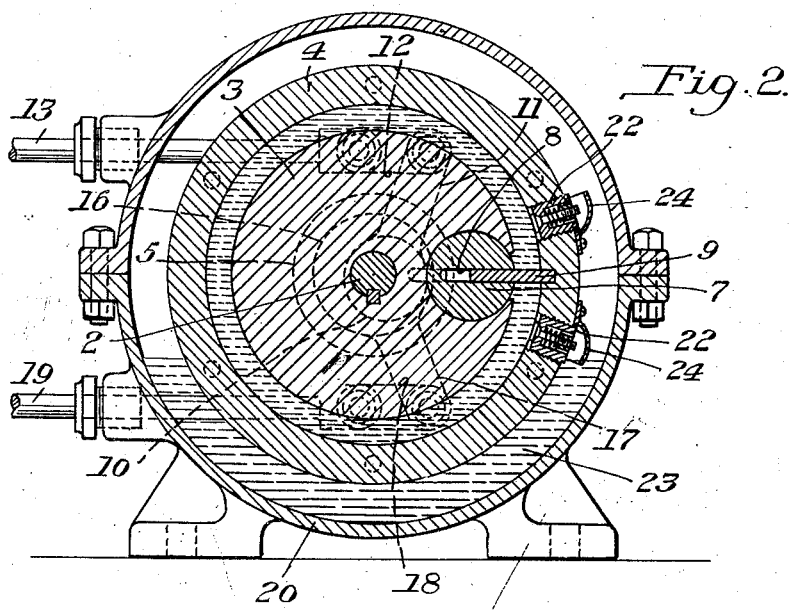
Figure 2 is a transverse vertical section in substantially the plane of line II—II of Figure 1, the parts being shown in an inoperative or non-braking position.

When the eccentrics are in the position shown in Figure 2 the cylinder 4 is concentric with the shaft 2, one of the eccentrics 10 off-setting the other eccentric 16. Upon moving the rods 13 and 19 to the left, as viewed in Figure 2, the cylinder 4, which has its bearings on the eccentrics is shifted eccentrically of the shaft 2 to a slight extent. Upon further movement of the rods 13 and 19 a position of maximum eccentricity is reached, which is shown in Figure 4.

Within the chamber 6 is a body of fluid, such for instance as oil or a semi-fluid, such as grease, as indicated in the drawings.

The action of the mechanism may now be followed. When the shaft 2 is rotating with the parts in the concentric relation shown in Figure 2, both the cylinder 4 and the piston 3 are rotating with the shaft, the piston being keyed to the shaft and the cylinder being keyed to the piston through the vane 9. The cylinder is of course revolving on the stationary eccentrics which form the bearing therefor. As long as the parts maintain the concentric relation shown in Figure 2 the mechanism offers no resistance to the rotation of the shaft. The fluid in the chamber 6 is evenly distributed around the piston 3.

When the rods 13 and 19 are operated to move the eccentrics 10 and 16 from the position shown in Figure 3, the cylinder and piston no longer have a common axis of rotation, as the cylinder rotates on an axis which is eccentric to the axis of the shaft 2. This is by reason of the fact that the hubs 5 on the cylinder have their bearing on the eccentrics 16. Although the cylinder and the piston rotate about different centers, they rotate together. By reason of the eccentric relation of the cylinder with respect to the piston, one point on the periphery of the piston is always closer to the wall of the cylinder than any other point on the periphery. This may be best seen by reference to Figure 4 where the cylinder and piston are in the positions of maximum eccentricity and wherein the periphery of the piston contacts with the inner wall of the cylinder at point $a$. This effectively divides the chamber 6 into two compartments $b$ and $c$, these compartments being separated by the vane 9. If the cylinder and piston are rotating in the direction of the arrow, there will be a tendency for the chamber $c$ to become smaller and the chamber $c$ to become larger. This means that the fluid must be displaced from the chamber $b$ to the chamber $c$. Since, however, the escape of fluid from the chamber $b$ to the chamber $c$ is prevented due to the fact that the piston and cylinder are in contact at point $a$, a pressure is built up in the chamber $b$, preventing the rotation of the elements. If the eccentrics are backed off from the position shown in Figure 4 to a very slight extent so that there is a very restricted passageway at the point $a$, the fluid can escape from the compartment $b$ to the compartment $c$ at a restricted rate, allowing for a very slight rotation of the shaft. As the eccentrics are backed off from the point of maximum eccentricity, there is less restriction to the displacement of the fluid from one compartment to the other, and less displacement of the fluid with a corresponding reduction in the braking effect.

Thus it will be seen that by the movement of the rods 13 and 19 the degree of braking to be effected can be varied. The rods 13 and 19, of course, might be connected with a common operating handle or pedal so that there operation can be simultaneously effected.

If the eccentrics are backed off to a slight extent so that there is an open passage from the compartment $b$ to the compartment $c$ a limited quantity of fluid can escape from one compartment to the other and the shaft 2 can rotate slowly, but the speed of rotation is limited by the size of the passageway at the point $a$. When the eccentrics are backed off to the position shown in Figure 3 the passageway is relatively large and a very limited braking action is obtained.

Thus it will be seen that while the whole brake structure rotates with the exception of the eccentrics 10 and 16 a braking action is secured with relatively little friction between parts. The degree of eccentricity of the cylinder can be changed very gradually so that a very gradual application of the brakes is possible, or it can be changed quickly, making possible a sudden application of the brake. As previously stated, when the eccentrics are returned to a neutral position at which time the cylinder and piston rotate about a common axis there is no braking action because there is no displacement of the fluid in the chamber.

It makes no difference in which direction the shaft 2 is rotating, as the braking action will be just as effective upon rotation of the shaft in either direction.

In order to secure the most satisfactory braking conditions the chamber 6 must be kept full of oil or other braking fluid. A heavy load on the brake tends to create an enormous pressure within the chamber 6 with the result that packing capable of withstanding the pressure would be difficult to secure. There would be a constant tendency for the oil to leak. According to the form of invention illustrated in Figures 1 to 4, means is provided for automatically keeping the chamber 6 full and collecting any oil which does escape from the interior of the cylinder. To this end a stationary casing 20 is provided about the mechanism, this casing having packed bearings at 21 through which the shaft 2 passes. In the wall of the cylinder, at each side of the vane 9 is an inwardly opening check valve 22 of any suitable or preferred construction. Contained within the bottom of the casing 20 is a body of oil or braking fluid 23. As the braking mechanism revolves, the check valves travel through the bath of braking fluid 23. If the cylinder is operating eccentrically of the shaft, there will be a reduction of pressure in the chamber $c$ with an increase in pressure in the chamber $b$ or vice versa. The reduction of pressure in one of the chambers will open one of the check valves 22, causing oil to be sucked into the chamber 6. In this way the mechanism automatically functions as a pump to maintain the chamber 6 full of oil or other braking fluid. In order to assist in this action fins 24 may be provided on the periphery of the cylinder adjacent the check valves, these fins being adapted to collect oil and throw it down onto the check valves upon rotation of the cylinder.

It will be observed that the mechanism not only operates with little friction but is free of any end thrust. The braking pressure is made effective without creating unequal pressures on those faces of the piston and cylinder which are in contact.

Instead of changing the eccentricity of the cylinder with respect to the piston, the cylinder may be keyed on the revolving shaft and the piston may operate about the variable eccentrics. Such an arrangement is shown in Figures 5 and 6 wherein 25 designates a revolving shaft, and 26 is a cylinder having a central web 27 which is keyed to the shaft 28. In the construction shown in Figure 5, as in the construction shown in Figure 1 the mechanism is constructed in duplicate in order to provide two units, one of which is 180° out of phase with the other. In the cylinder 26 are two concentric chambers 28 and in each cylinder 28 is a piston 29, which is in the form of a solid disk of metal. The piston 29 rotates about an eccentric sleeve 30 having an operating extension 31. Within the sleeve 30 and bearing on the shaft 25 is a second eccentric sleeve 32 having an operating extension 33. By moving the operating extensions 31 and 33 the eccentrics 30 and 32 can be adjusted to move the piston 29 from a concentric position with reference to the shaft 25 to an eccentric position, as shown in Figure 6 wherein the piston is at a point of maximum eccentricity.

Set in the piston 29 is a pin 34 having a slot 35 therein in which is slidably received one end of a vane 36, this vane having its other end received in the cylinder.

In operation the cylinder 26 rotates with the shaft 25, and as it rotates the pistons 29 are carried around with it. As long as the eccentrics 30 and 32 are in the neutral position there is no displacement of the fluid which is in the chamber 28 and no braking action occurs. When, however, the eccentrics are rotated through an arc to provide a bearing for the piston 29 which is eccentric to the shaft 25, the fluid around the piston must be displaced as the shaft 25 rotates, and the shaft may only rotate to the extent permitted by the space between the piston and the cylinder. The operation of the mechanism is in all respects similar to the mechanism shown in connection with Figure 1 except that the eccentricity of the pistons is varied instead of the eccentricity of the cylinders being varied.

It will be noted that in both constructions there is a vane which is fixed to the inside of the cylinder, connecting the cylinder and piston members and arranged to permit of an oscillating relative movement between the cylinder and the piston, this vane also being slidably entered in one of said members. This is provided for by the slotted pins 7 and 34 of the respective constructions, and is provided to give the necessary freedom of action between the two elements rotating in unison about their respective centers.

It will be understood that the construction shown in Figures 5 and 6 may revolve within a stationary casing similar to the casing 20 of the construction shown in Figure 1 and that automatic check valves may be provided as described in connection with the construction shown in Figures 1 to 4.

In Figures 7 and 8 there is shown a further modification wherein a form of packing is used which is intended to prevent leakage of fluid from the braking mechanism. In this construction the rotating shaft is designated 40. Keyed on the shaft 40 is a piston 41 in the form of a circular disk of solid metal. Enclosing the piston 41 is a cylinder 42 having a chamber 43 therein. The cylinder 42 is provided with hub portions 44 whose internal diameter is considerably greater than the diameter of the shaft 40 so that under all conditions the hubs 44 are free to move laterally with respect to the shaft 40. The hubs 44 are received in bearing rings 45 which have an eccentric opening therethrough to receive the hubs 44, this arrangement being best shown in Figure 8. The exterior of each of the bearing rings 45 is rotatably mounted in a fixed bearing 46, the center of the bearing 46 being laterally offset with respect to the center of the shaft 40. By rotating bearing rings 45 in the fixed bearings 46 the hubs 44 may be moved into and out of concentric relation with respect to the shaft 40, thereby changing the eccentricity of the cylinder 42 with respect to the piston 41.

Any suitable means may be provided for adjusting the eccentrics, but I have shown each eccentric ring 45 as being provided with a segment 47 having peripheral teeth 48 therein. Meshing with the teeth 48 of each segment is a pinion 49 on an operating shaft 50. The shafts 50 may be operated from any desired mechanism, and of course would be connected for operation in unison.

The outer ends of the hubs 44 are threaded to receive one part 51 of a high pressure packing, which packing includes a flexible tube 52. The other end of the tube 52 is clamped to a disk 53 attached to the shaft 40.

When the shaft 40 rotates the cylinder 42 rotates. As long as the rings 45 are in a neutral position the cylinder 42 will rotate concentrically about the shaft 40. Upon shifting the eccentrics 45 however the cylinder 42 will rotate eccentrically of the shaft 40, the degree of eccentricity varying according to the position of the eccentric ring 45. When the cylinder 42 is rotating eccentrically of the shaft 40, there is a displacement of the fluid in the cylinder and the flow of fluid about the piston is restricted according to the degree of eccentricity whereby the braking action as hereinbefore described is secured. The flexible connection 52 allows for the necessary relative movement between the piston and cylinder, while at the same time providing a high pressure packing for confining the oil or braking fluid against escape, even though it should be forced out of the chamber 43.

Annular recesses are peripherally provided at 54 into which escaping fluid may flow and be returned to the chamber 43 by centrifugal force.

In this construction there is provided a vane 56 similar in purpose to the vane 9 shown in Figure 1, there being a similarly slotted pin for cooperation with the vane.

The construction shown in Figure 7 is similar to that shown in Figure 1 in that the piston is keyed to the shaft while the cylinder rotates about an adjustable eccentric, but it differs from the construction shown in Figure 1 in that there is but a single adjustable eccentric and this has its bearing in a fixed bearing ring, whereas in the construction shown in Figure 1 there are two eccentrics, no fixed bearing being provided, one of the eccentrics being loose on the shaft 2.

The mechanism provides a brake of novel construction wherein the friction of wearing parts is not utilized to afford the braking action but wherein fluid pressure is used in such a way that there is a minimum of friction and a freedom of any end thrust.

While the invention has been specifically described as being applicable to a braking system, it will be understood that the mechanism is not restricted to such use as it may obviously be used in clutches, pumps, and other mechanical elements, as will be readily understood by one skilled in the art. It will also be obvious that the invention is not restricted to the particular construction, arrangement and description of parts herein illustrated, as it may be otherwise constructed, and it is contemplated that the device might be built directly into a wheel structure so as to provide a brake mechanism directly in the wheel rather than being provided on a propeller shaft which drives the wheel. Various changes and modifications may be made within the contemplation of my invention and under the scope of the following claims.

I claim:

1. In an apparatus of the class described, a fluid pressure unit comprising a cylinder member having a substantially circular chamber therein, a substantially circular piston member within the cylinder, a rotatable member which carries one of said members, an eccentric on which the other of said members is mounted, a vane carried jointly by the cylinder and piston member, and means for rotating the unit.

2. In an apparatus of the class described, a cylinder member having a substantially circular chamber therein, a piston member in the chamber which is substantially circular and which is of less diameter than the chamber, a substantially radial vane connecting the piston member and the cylinder member, said vane being slidably received in one of said members, a concentric mounting for one of the members and an eccentric mounting for the other member.

3. In an apparatus of the class described, a cylinder member having a substantially circular chamber therein, a piston member in the chamber which is substantially circular and which is of less diameter than the chamber, a substantially radial vane connecting the piston member and the cylinder member, said vane being slidably received in one of said members, a concentric mounting for one of the members, an eccentric mounting for the other member, and means for varying the eccentricity of said mounting.

4. In a fluid pressure brake, a driving element, a cylinder member caried by the driving element having a substantially circular chamber therein, a substantially circular piston member in said chamber and of less diameter than the chamber, a vane connecting the piston member and the cylinder member and having a slidable engagement with one of said members, one of said members having a concentric mounting on the driving element and means forming a bearing for the other of said members movable from a position concentric with the driving member to a position eccentric to the driving member.

5. In a fluid pressure brake, a driving element, a cylinder member carried by the driving element having a substantially circular chamber therein, a substantially circular piston member in said chamber and of less diameter than the chamber, a vane connecting the piston member and the cylinder member and having a slidable engagement with one of said members, and an adjustable element providing a bearing for one of said members and movable from a position concentric with the driving element to a position eccentric to the axis of the driving element, the other of said members being concentrically mounted on the driving element.

6. A fluid pressure brake comprising a shaft, a cylinder member surrounding the shaft and having a substantially circular chamber therein, a substantially circular piston member surrounding the shaft within said chamber and of less diameter than the chamber, one of said members being keyed to the shaft, an adjustable element providing a bearing for the other member and movable from a position where said other member rotates concentrically with the shaft to a position where it rotates eccentrically of the shaft, and a vane connecting the cylinder member and the piston member, said vane being slidably received in one of said members and having an oscillating motion relative to one of said members when one of said members is eccentric to the shaft.

7. A fluid pressure brake comprising a cylinder member and a piston member within which the cylinder member operates, a vane between the cylinder member and the piston member, means for rotating both of said members, one of said members being rotatable about its own axis, and an adjustable bearing for the other member by means of which the said other member may be made to rotate concentrically with the first or eccentrically thereof.

8. A fluid pressure brake, a shaft, a substantially circular piston member surrounding the shaft, a cylinder member enclosing the piston member and having a circular chamber therein which is of larger diameter than the diameter of the piston member, a vane extending between the piston member and the cylinder member and slidably received in one of said members, one of said members being keyed to the shaft, an eccentrically adjustable bearing for the other member, said members being rotatable as a unit.

9. A fluid pressure brake, a shaft, a substantially circular piston member surrounding the shaft, a cylinder member enclosing the piston member and having a circular chamber therein which is of larger diameter than the diameter of the piston member, a vane extending between the piston member and the cylinder member and slidably received in one of said members, one of said members being keyed to the shaft, an eccentrically adjustable bearing for the other member, said members being rotatable as a unit, a casing enclosing said cylinder member and having a bath of fluid therein, and an inwardly opening check valve in the cylinder adapted to be carried through the bath of oil in the casing upon rotation of the shaft.

10. A fluid pressure brake, a shaft, a substantially circular piston member surrounding the shaft, a cylinder member enclosing the piston member and having a circular chamber therein which is of larger diameter than the diameter of the piston member, a vane extending between the piston member and the cylinder member and slidably received in one of said members, one of said members being keyed to the shaft, an eccentrically adjustable bearing for the other member, said members being rotatable as a unit, a casing enclosing said cylinder member and having a bath of fluid therein, and an inwardly opening check valve in the cylinder at each side of the vane and adapted to be carried through the bath of oil in the casing upon rotation of the shaft.

11. In an apparatus of the class described, a shaft, a cylinder member surrounding the shaft having a substantially circular chamber therein, a substantially circular piston member within the cylinder and of less diameter than the diameter of the chamber, a vane extending between the cylinder and the piston and being slidably engaged with one of said members, one of said members being carried on the shaft, and means providing an eccentrically adjustable bearing for the other member comprising a pair of sleeves, one of which is received within the other and one of which is loosely mounted on the shaft, said sleeve members having eccentric portions, at least one of the sleeves being rotatable relatively to the other.

12. In an apparatus of the class described a shaft, a cylinder member surrounding the shaft having a substantially circular chamber therein, a substantially circular piston member within the cylinder and of less diameter than the diameter of the chamber, a vane extending between the cylinder and the piston and being slidably engaged with one of said members, one of said members being carried on the shaft, and means providing an eccentrically adjustable bearing for the other member comprising a pair of sleeves, one of which is received within the other and one of which is loosely mounted on the shaft, said sleeve members having eccentric portions, and means for simultaneously adjusting both sleeves.

13. In a fluid pressure device of the class described, a rotating unit comprising a shaft, a cylinder member surrounding the shaft and having a circular chamber therein, a piston member surrounding the shaft and received within said chamber, said piston member being of less diameter than the chamber, one of said members being carried directly on the shaft, and a normally fixed eccentrically adjustable member on the shaft providing a bearing for the other of said members.

In testimony whereof I have hereunto set my hand.

FREDERICK C. NENZEL.